United States Patent
Gardette et al.

(10) Patent No.: US 8,471,209 B2
(45) Date of Patent: Jun. 25, 2013

(54) METHOD FOR MAINTENANCE OF AN ARRAY OF BOLOMETER-TYPE DETECTORS

(75) Inventors: Hubert Gardette, Paris (FR); Cyrille Becker, Paris (FR); Francois-Boris Mijolla, Paris (FR)

(73) Assignee: Sagem Defense Securite, Paris (FR)

( * ) Notice: Subject to any disclaimer, the term of this patent is extended or adjusted under 35 U.S.C. 154(b) by 912 days.

(21) Appl. No.: 12/597,695

(22) PCT Filed: Apr. 17, 2008

(86) PCT No.: PCT/FR2008/050680
§ 371 (c)(1),
(2), (4) Date: Oct. 26, 2009

(87) PCT Pub. No.: WO2008/145897
PCT Pub. Date: Dec. 4, 2008

(65) Prior Publication Data
US 2010/0133438 A1 Jun. 3, 2010

(30) Foreign Application Priority Data
Apr. 26, 2007 (FR) ...................................... 07 03037

(51) Int. Cl.
G01J 5/02 (2006.01)
G01J 5/00 (2006.01)
(52) U.S. Cl.
USPC ........................................ 250/352; 250/338.1
(58) Field of Classification Search
USPC ............................................ 250/352, 338.1
See application file for complete search history.

(56) References Cited

U.S. PATENT DOCUMENTS

| 5,756,999 | A | 5/1998 | Parrish |
| 6,465,785 | B1 | 10/2002 | Mcmanus |
| 2004/0113082 | A1 | 6/2004 | Robert |
| 2008/0302956 | A1* | 12/2008 | Anderson ................. 250/252.1 |
| 2009/0014652 | A1* | 1/2009 | Chammings et al. ......... 250/330 |

FOREIGN PATENT DOCUMENTS

| FR | 2 848 666 | 6/2004 |
| WO | WO 2006/100662 | 9/2006 |
| WO | WO 2006/100663 | 9/2006 |

OTHER PUBLICATIONS

International Search Report for related international application No. PCT/FR2008/050680, report dated Apr. 17, 2008.

* cited by examiner

*Primary Examiner* — David Porta
*Assistant Examiner* — Mindy Vu
(74) *Attorney, Agent, or Firm* — Miller, Matthias & Hull LLP

(57) ABSTRACT

A method for maintenance of an array of bolometer-type detectors comprises heating of certain detectors to a threshold temperature. The heating is performed by supplying resistive detection elements with electric currents, and the threshold temperature is determined for each detector as a function of a measurement made previously on said detector. Such method makes it possible to eliminate persistent images caused by radiation overexposure, or by damage to the thermoelectric properties of certain pixels appearing during the manufacture or ageing thereof. The method does not require the use of an oven or Peltier element, thus avoiding the risk for such heating component to damage irreversibly the reading and CMOS addressing circuits on which the detectors are hybridised or deposited.

18 Claims, 2 Drawing Sheets

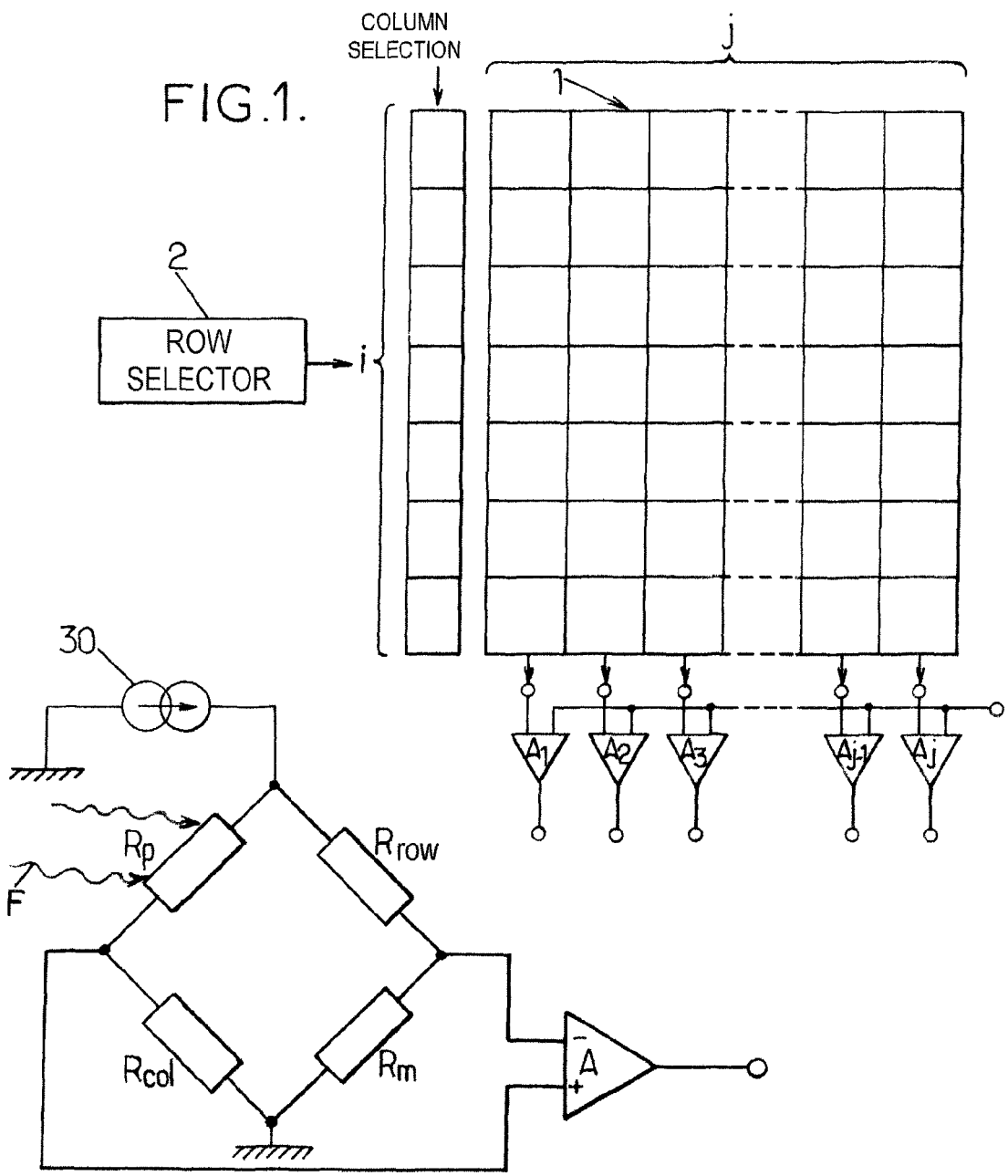
FIG.1.
FIG.2.
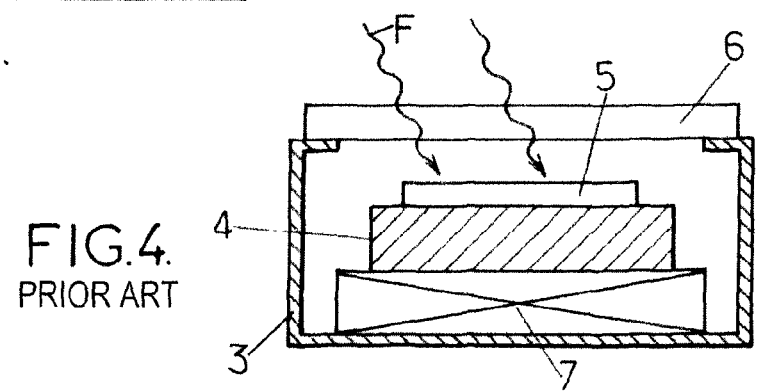
FIG.4.
PRIOR ART

METHOD FOR MAINTENANCE OF AN ARRAY OF BOLOMETER-TYPE DETECTORS

CROSS-REFERENCE TO RELATED APPLICATIONS

This application is a U.S. national stage filing of International Patent Application No. PCT/FR2008/050680 filed on Apr. 17, 2008, which claims priority under the Paris Convention to the French Patent Application No. 07 03037, filed on Apr. 26, 2007.

FIELD OF THE DISCLOSURE

The present invention relates to a method for maintenance of a bolometer-type detector array. It also relates to an electromagnetic radiation measurement assembly comprising a bolometer-type detector array, which is suitable for implementing such a maintenance method.

BACKGROUND OF THE DISCLOSURE

Bolometer-type detectors are used for measuring infrared, visible or ultraviolet radiation energy produced by a radiating scene. Said detectors may be arranged in an array, such as a focal plan array commonly referred to as "FPA". Such FPA bolometer-type detector arrays are described in the documents WO 2006/100662 and WO 2006/100663, for example.

A Wheatstone bridge structure or a differential structure is also commonly used in bolometer-type detector arrays. Such a structure is represented in FIG. 1 of the document FR 2 846 666, in particular. It makes it possible to reduce the sensitivity of the measurement results supplied by the detectors, with respect to variations in the internal ambient temperature of the measurement assembly comprising the array.

Furthermore, the element of each bolometer-type detector which is sensitive to electromagnetic radiations is an electrically resistive element, in which the electric resistance varies when the detector receives radiation. This variation produces the radiation measurement. In routine practice, the radiation-sensitive resistive element is made of vanadium oxide ($VO_x$) or amorphous silicon.

However, bolometer-type detector arrays remain highly sensitive to ambient temperature variations.

Moreover, because each detector has a different position in the array, different detectors receive different radiations, which are liable to modify the features of each detector, and the operating parameters thereof in measurement, in a manner varying between different detectors. Furthermore, initial variations exist between the detectors from the manufacture of the array, for individual detector properties such as the electric resistances and response sensitivities thereof. These initial variations also contribute to the variations between the respective responses of detectors in the same array when said array receives uniform radiation energy.

Put another way, the same radiation is liable to be measured with a different value depending on the position in the array of the detector used for the measurement thereof.

For this reason, it is known to correct deviations between bolometer-type detectors in the same array by compensating, for each detector, for the initial offset and gain variations.

To this purpose, features of each bolometer-type detector, such as the initial offset and gain thereof, are determined by means of preliminary measurements made at predefined and constant temperatures. Two lookup tables are deduced therefrom, for the gains and initial offsets of the detectors in the array, respectively. These lookup tables make it possible to compensate for the initial offset and gain of each detector and consist of corrections applied to the detection results produced by the detectors after the radiations have been detected.

However, for the measurements obtained with all the detectors of the same array to be accurate and consistent, it is necessary to update at least the initial offset correction lookup table regularly, generally every two to three minutes. This may be performed by exposing all the detectors in the array to a uniform image. Such operation is usually performed using a shutter which masks an external radiation scene uniformly with respect to the measurement assembly.

Nevertheless, the present applicant has observed that, even if the initial offset and/or gain correction lookup tables for the detectors in the array are updated frequently or regularly, this does not eliminate the persistence resulting from overexposure experienced by some bolometer-type detectors. Such overexposure may result from the exposure of at least some of the detectors of the array to an intense and/or long-term radiation flow. This flow caused long term impairment of the features of the detectors which have received it. Such overexposure may be compared to glare with a persistent effect. For example, exposing a bolometer-type detector intended to perform night measurements to the sun for a few seconds produces overexposure persistence. This persistence may last for several days, or several weeks, and may be explained by an impairment of the material of the resistive element of the bolometer which is sensitive to radiations. Such impairment is particularly probable as this sensitive material is generally in an unstable state of equilibrium, with respect to the actual physicochemical condition thereof. The impairment of the sensitive material of some of the detectors of the array produces offsets of subsequent measurement results. These offsets appear as a "phantom" image of the overexposure, superimposed on the images resulting from subsequent exposures.

Therefore, it is of particular interest to propose a method for readjusting the state of bolometer-type detectors that have been subjected to radiation overexposure, so as to restore response uniformity of all the detectors in an array.

SUMMARY OF THE DISCLOSURE

To this purpose, it has been proposed to reset the detectors of a microbolometer array by heating them using a Peltier element underneath the array. All the detectors of the array are thus heated to the same temperature and may be cooled together in the same way. In this way, overexposure persistence found in some of the detectors of the array may be eliminated. Such heating represents a maintenance method, used apart from periods of use of the detector array to make radiation measurements.

FIG. 4 represents an electromagnetic radiation measurement assembly, to which such maintenance method may be applied. The assembly comprises a housing 3 which is hermetically sealed and the interior of which remains in a vacuum. A printed circuit 5 is arranged on a substrate 4 inside the housing 3. The circuit 5 comprises electric resistors forming bolometer-type detectors. These resistors are sensitive to electromagnetic radiation F and are exposed via a transparent window 6 which closes the housing 3. A Peltier element 7 is also positioned under the substrate 4, for heating the radiation-sensitive resistors.

However, this method involves a number of drawbacks. Firstly, it requires the provision of a Peltier element under the detector array, which increases the price and size of the measurement assembly. Secondly, the Peltier element renders the heat transfers occurring within the measurement assembly when radiation is detected more complex. Finally, the Peltier element generates high electricity consumption during the heating of the array, and during the cooling thereof at a controlled rate.

Therefore, it is of particular interest to have a method for harmonising the responses of detectors in an FPA type array, which does not require high electricity consumption, or the addition of supplemental components such as a Peltier element.

To this purpose, the document U.S. Pat. No. 5,756,999 proposes a measurement sequence comprising, prior to each exposure of a bolometer-type detector array to perform a radiation measurement, heating of the detectors using the radiation-sensitive resistive elements thereof. A Peltier element is thus not required. However, this consists of heating for adjusting the operating point of each detector, performed just before each radiation measurement exposure. Such heating modifies the operating point of each detector reversibly before said detector is exposed to radiation for the measurement. It consists of an adjustment of the operating point performed according to a detector state curve in a resistor-temperature axis system. Therefore, the heating should be performed just before each radiation measurement exposure and it is not a maintenance operation of the radiation measurement assembly, which would be separate from the measurement operations. Furthermore, such heating is not suitable for eliminating radiation overexposure persistence.

One object of the present invention is therefore to harmonise bolometer-type detectors in an FPA array having at least one persistence caused by radiation overexposure. More specifically, the object of the invention is to stop the persistence that could have been caused by intense radiation sources or sources which have high temperatures.

A further object of the invention is to harmonise spatially the bolometer-type detectors of an FPA array.

A further object of the invention is to propose a method for harmonising bolometer-type detectors in an FPA array, capable of eliminating variations existing between different detectors in the array, in particular variations resulting from the manufacture or poor ageing thereof.

A further object of the invention is to propose a method for harmonising bolometer-type detectors of an FPA array, capable of eliminating initial offset and/or gain variations, existing between different detectors in the array.

A further object of the invention is to carry out such harmonisation without requiring high electricity consumption, either from the internal power source in the radiation measurement assembly comprising the detector array or from a power source outside this assembly.

A further object of the invention is to perform such harmonisation without using a heating element such as a Peltier element or oven associated with the measurement assembly.

A further object of the invention is to perform such harmonisation by achieving temperatures greater than 100° C. only for the sensitive element of the detector, without heating or damaging irreversibly the CMOS reading and addressing circuit located under the detector. Such damage might occur when using an oven or a Peltier element.

A further object of the invention is to enable such harmonisation to be carried out either by the user of the radiation measurement assembly or a specialised maintenance department.

A further object of the invention is to propose a harmonisation method applicable both to all or part of the detectors in an FPA array.

A further object of the invention is finally to propose a method for harmonising bolometer-type detectors in an FPA matrix, which does not create any significant risk of degassing or degradation of a vacuum level present in a housing containing the detector array.

According to a first aspect thereof, the present invention proposes a method for maintenance of an array of bolometer-type detectors suitable for measuring electromagnetic radiations originating from a radiating scene. This method is suitable for stopping persistence of radiation overexposure experienced by at least one of the detectors of the array. It comprises the following steps, which are performed apart from a radiation measurement sequence:

/1/ measurement of a temperature and/or electric resistance of a resistive element of at least one identified detector of the array;

/2/ for said identified detector, setting of a threshold temperature and/or threshold resistance, respectively greater than the temperature measured and/or less than the resistance measured;

/3/ supply of a resistive element of at least one detector of the array, with an electric current suitable for heating the identified detector at least up to the threshold temperature and/or the threshold resistance; and /4/ cooling of the identified detector, by progressively reducing the electric current supplied to the resistive element used for heating the identified detector.

Thus, according to the invention, each detector may be heated as a function of a temperature and/or resistance value initially determined for said detector. In this way, a modification or reset is made on the detector, which may be independent from the initial state of the other detectors, and adapted according to specific deviations characterised for said detector. In particular, the modification or reset made on a detector may be adapted to a possible overexposure previously experienced by said detector.

To this purpose, according to a preferred embodiment of the invention, the threshold temperature and/or the threshold resistance may be set in step /2/ as a function of a deviation between the temperature and/or resistance measured in step /1/ for the identified detector, and a temperature and/or resistance reference value, respectively.

The method according to the invention may also comprise a further step for measuring the respective temperatures and/or resistances of the detectors of at least part of the array. In this case, the threshold temperature and/or the threshold resistance of the identified detector may be set in step /2/ as a function of the temperatures and/or resistance measured for the detectors of this part of the array, in addition to the temperature and/or resistance measured for the identified detector.

Optionally, the maintenance method may comprise an additional step for selecting the identified detector. This additional step is performed between steps /1/ and /2/. Subsequently, steps /2/ to /4/ are performed for the identified detector only if the temperature and/or resistance measured in step /1/ for said detector satisfy a defined selection condition.

In particular, this selection condition may be defined such that the identified detector is selected for steps /2/ to /4/ if it has persistence from a previous radiation overexposure or damage.

Each detector which is identified is heated by means of a Joule effect during step /3/, so as to restore it to a reference state or to a state similar to that of at least some of the other detectors of the array. In particular, the material of the radiation-sensitive resistive element thereof may thus be restored to a predetermined physical and/or chemical state. In particular, step /3/ may produce a structural stabilisation of the material of said sensitive resistive element, or re-adsorption of oxidant atoms, depending on the type of material.

More generally, step /3/ of a method according to the invention may be performed so as to modify a material of the identified detector, which is sensitive to electromagnetic radiation during a radiation measurement sequence.

To this purpose, the detector identified may be heated in step /3/ up to a suitable temperature, for a suitable duration.

In particular, it may be heated to a temperature greater than 60° C., preferentially greater than 100° C.

Similarly, step /3/ may be performed so as to maintain the identified detector for a duration of at least one minute at a temperature greater than or equal to the threshold temperature, and/or at a resistance less than or equal to the threshold resistance, determined for said identified detector.

Furthermore, to restore the identified detector to a more stable state, avoiding a quenching effect, the cooling in step /4/ may have a duration greater than at least two minutes, or greater than ten minutes.

According to a first alternative embodiment of the invention, the resistive element of the detector used in step /3/ for heating the identified detector may belong this identified detector. In this case, it may comprise the material modified in said step.

According to a second alternative embodiment of the invention, the heating in step /3/ may be performed with at least one resistive element of a detector of the array which is different to that identified.

In these two alternative embodiments of the invention, a plurality of detectors which are identified may be processed simultaneously according to steps /2/ to /4/ of the maintenance method of the invention, each being heated during the same execution of step /3/. The total duration of the maintenance method, performed for said plurality of identified detectors, may thus be reduced with respect to a plurality of successive executions of the method respectively dedicated to the same detectors, taken individually. To this purpose, step /1/ of the maintenance method may be performed for a plurality of identified detectors. In this case, electric currents are supplied in step /3/ simultaneously to respective resistive elements of a plurality of detectors of the array. These electric currents may be determined using an algorithm for processing the temperatures and/or resistances measured respectively for the identified detectors, so as to heat them simultaneously. In particular, the identified detectors may be heated simultaneously up to a common maximum temperature.

In any case, no additional heating element is required to implement the invention, further to the resistive elements of the detectors of the array. In particular, no Peltier element or heating oven is required.

According to an improvement of the invention, a maintenance method according to the invention may be performed automatically. Furthermore, it may be started automatically, for example at regular time intervals or as a function of the number of radiation measurements made since a last prior execution of the maintenance method.

According to a second aspect of the present invention, said invention also proposes an assembly for measuring electromagnetic radiation from a radiation scene, comprising:
an array of bolometer-type detectors;
an addressing system suitable for identifying any detector in the array; and
means for maintaining said array, suitable for implementing each step of a maintenance method as described above.

The maintenance means may comprise themselves:
means for measuring temperatures and/or resistances of respective resistive elements of detectors in the array, said measurement means being suitable for supplying measurement signals for identified detectors of the array;
a unit for processing the temperatures and/or resistances measured by the measurement means for the identified detectors, said processing unit being suitable for determining a threshold temperature and/or a threshold resistance for each of the identified detectors;
an electric current power supply unit, connected to the detectors of the array by the addressing system; and
a unit for computing at least one electric current to be supplied by the power supply unit to at least one detector of the array, so that each identified detector reaches a temperature greater than or equal to the threshold temperature, and/or a resistance less than or equal to the threshold resistance, determined for said identified detector, said computation unit being additionally suitable for controlling a progressive reduction of said electric current.

Such a measurement assembly is suitable for the implementation of a maintenance method according to the first aspect of the invention.

Optionally, the maintenance means may also be suitable for controlling an automatic execution of the maintenance method.

According to a third aspect of the present invention, said invention also proposes a method for maintaining an array of i×j bolometer-type detectors, the method comprising the following steps:
supply of an array of i×j bolometer-type detectors for detecting and measuring the electromagnetic radiation from a radiating scene;
measurement of the temperature and/or resistance of a resistive element of at least one of the i×j detectors;
definition of a threshold temperature and/or threshold resistance, greater than the temperature and/or resistance measured, to which said at least one of the i×j detectors should be set;
power supply of at least one resistive element of said at least one of the i×j detectors, apart from periods of detection and/or measurement of the radiation from the radiating scene;
heat dissipation by Joule effect from said powered resistive element;
heating of said at least one of the i×j detectors comprising said powered resistive elements up to said threshold temperature or threshold resistance; and
control of the cooling of said at least one of the i×j detectors by controlling the current supplied and the power dissipated over time by Joule effect.

In order to enable the maintenance and re-harmonisation of all or part of the i×j detectors, a step for measuring the temperature and/or resistance of all or part of the i×j detectors may be provided.

So as to harmonise the temperature and/or resistance of the i×j detectors, the threshold temperature and/or threshold resistance value may be defined as a function of the temperature and/or resistance of all the i×j detectors.

In order to automate a method according to the third aspect of the invention, this method may comprise a step for processing the temperatures and/or resistances measured. This processing may be performed using a data processing algorithm for determining the value of the currents to be supplied to the resistive elements of the i×j detectors of the array so that the temperature and/or resistance of at least one resistive element of at least part of all the i×j detectors reaches the same threshold temperature and/or threshold resistance value after the production of a Joule effect from the resistive elements supplied with current.

In order to select the detectors to be supplied with current, the method according to the invention may comprise a step for selecting the detectors to be supplied with current and/or a step for supplying the selected detectors with current, performed using CMOS type addressing.

According to a fourth aspect of the present invention, it finally proposes a focal plan array assembly comprising an array of i×j bolometer-type detectors and means for maintaining said array, the maintenance means comprising themselves:

means for measuring the temperature and/or resistance of at least one resistive element of each of the i×j bolometer-type detectors;

means for harmonising the temperature and/or resistance of at least one resistive element of at least one part of all the i×j bolometer-type detectors using measurements recorded by the measurement means, the harmonisation means comprising themselves:

a unit for processing the temperature and/or resistance measurements of at least one resistive element of at least one of the i×j detectors, recorded by the measurement means;

a unit for controlling the current power supply of the i×j detectors;

a unit for computing the current to be applied by the current power supply control unit to said at least one of the i×j detectors so that said at least one of the i×j detectors reaches a threshold temperature and/or threshold resistance after energy dissipation by Joule effect; and a unit for the servo-control computation of the current to be applied by the current power supply control unit to said at least one of the i×j detectors so that said at least one of the i×j detectors observes a controlled cooling sequence over time.

These third and fourth aspects of the invention have at least some of the advantages cited above, in relation to the first aspect of the invention.

BRIEF DESCRIPTION OF THE DRAWINGS

The present invention is now described using an example of an embodiment given merely for illustrative and non-limitative purposes, according to the appended figures wherein:

FIG. 1 is a simplified schematic representation of an array of bolometer-type detectors, to which the invention may be applied;

FIG. 2 is a schematic representation of a Wheatstone bridge structure of a bolometer-type detector, to which the invention may be applied;

FIG. 4, already described, is a simplified sectional view of the general structure of a focal plan array of bolometer-type detectors, as known from the prior art.

DETAILED DESCRIPTION OF THE DISCLOSURE

Figure 3:
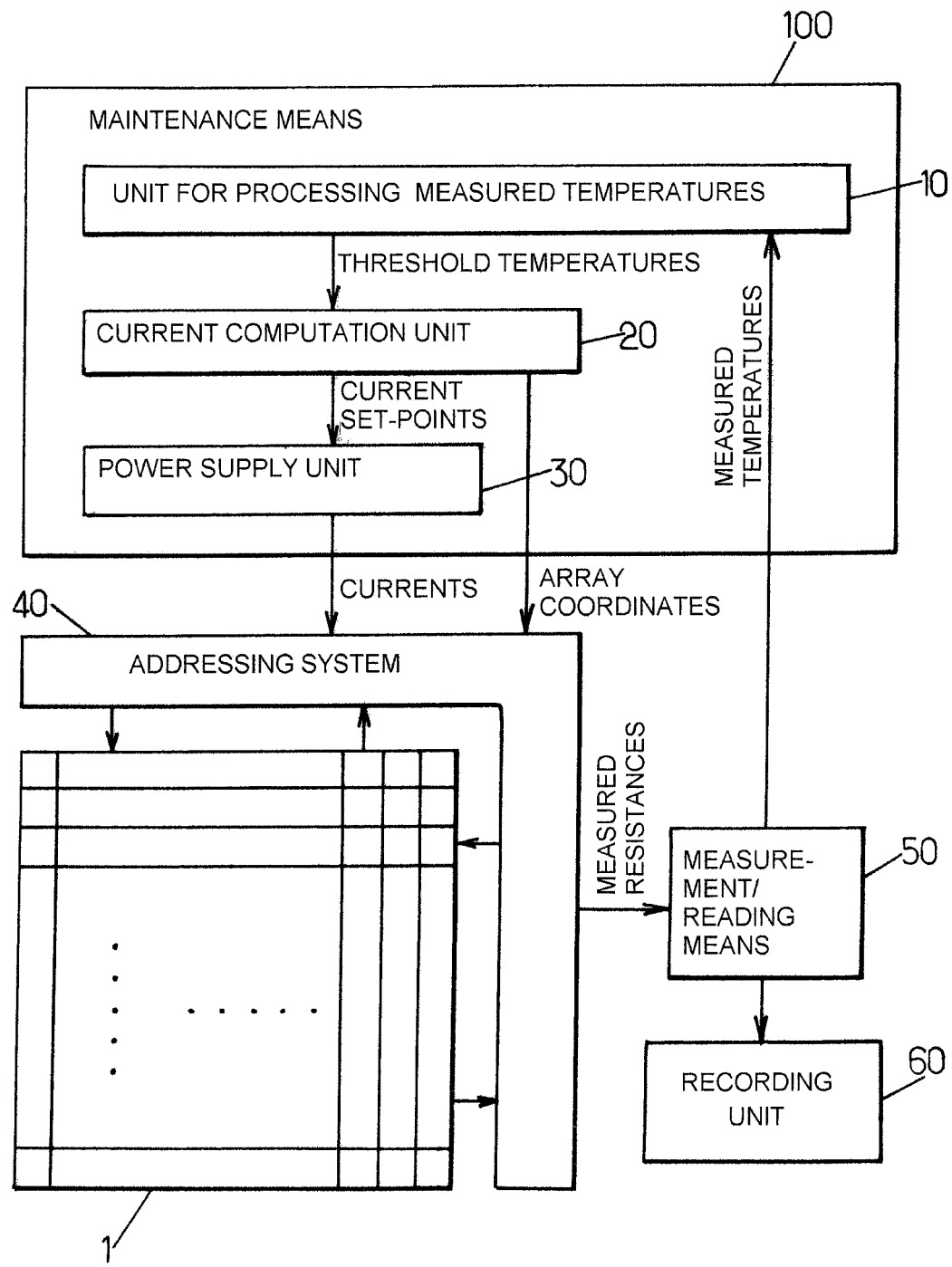
FIG. 3 is a synoptic diagram of a radiation measurement assembly to which the invention may be applied.

As represented in FIG. 1, an FPA type array 1 has i rows and j columns of bolometer-type detectors. Therefore, it comprises i×j detectors. The measurement and reading of the detection signals produced respectively by the detectors are performed by first selecting one of the i rows of the array 1, using a row selector referenced 2.

After a row has been selected, the detection signals produced by the detectors of this row are recorded and transmitted to amplifier inputs referenced $A_1$-$A_j$ in the figure. The amplifiers $A_1$-$A_j$ are dedicated respectively to the columns of the array 1.

To produce a differential measurement, all the detectors of the array 1 may be included in a Wheatstone bridge structure as represented in FIG. 2. This structure comprises:

a resistor $R_p$ for each bolometer-type detector of the array 1, which is sensitive to electromagnetic radiation F and referred to as the active resistor;

a line resistor, denoted $R_{row}$, which is common to all the detectors of the same row of the array 1;

a resistor $R_m$ which is common to all the detectors of the array 1; and a column resistor, denoted $R_{col}$, which is common to all the detectors of the same column of the array 1.

The array 1 thus comprises i×j resistors $R_p$, j resistors $R_{col}$, i resistors $R_{row}$ and a single resistor $R_m$. However, it is possible to design each of said resistors $R_p$, $R_{row}$, $R_{col}$ and $R_m$ in the form of a plurality of resistors connected in parallel.

The active resistor $R_p$ of each detector is heat-insulated and exposed to the electromagnetic radiation F from a scene towards which the radiation measurement assembly is oriented.

The row resistors $R_{row}$, column resistors $R_{col}$ and the resistor $R_m$, are masked from to the electromagnetic radiations F originating from the scene.

The resistors $R_m$ and $R_{col}$ are kept in good thermal contact with a substrate of the array 1.

The individual features of the detectors may have manufacturing variations. These variations result for example from some manufacturing method parameters controlled with a limited precision throughout the array 1. Such variations may relate, in particular, to the electric and thermal resistivities of the materials comprised in each detector, the thermal variation coefficients thereof and the thermal capacities thereof.

A maintenance method according to the invention, which is applied to such a bolometer-type detector array, is now described.

In a first step, the temperature and/or resistance of at least one of the active resistors $R_p$ is measured. Optionally, such a measurement may be performed for a plurality or all the resistors $R_p$ of the array 1. Those skilled in the art will understand that, because the operating principle of a bolometer which is based on a relationship between the temperature and the electric resistance value of a resistive element, a measurement of the value of an active resistor $R_p$ is equivalent to a measurement of the temperature thereof. To this purpose, the radiation measurement assembly comprises temperature/resistance measurement means which are coupled with the active resistors $R_p$ by suitable addressing means. After said first step, a measured resistance/temperature value is available for some of the active resistors $R_p$ of the array 1.

Optionally, said first step may be performed when a shutter has been positioned in front of the array 1, to isolate said array from radiations originating from outside the measurement assembly.

In a second step of the maintenance method, these measured values are used to determine, for each active resistor $R_p$, a temperature/resistance threshold value up to which said active resistor needs to be heated.

To this purpose, according to a first method, the value measured for each active resistor $R_p$ may be compared to a reference value. A deviation between the measured value and the reference value may be caused by overexposure previously experienced by the detector in question, and the magnitude of said deviation is related to the intensity of the overexposure. In other words, some features of the active resistor $R_p$ of the detector are subject to long term impairment, and one of the objects of the maintenance method is to restore the detectors to a reference state. The temperature/resistance threshold value for each detector to which the method is applied may be determined on the basis of this deviation, for example by applying a recorded equation or using a correspondence lookup table associating threshold values with deviation values obtained.

When the maintenance method is applied for the first time to the array 1, it may also eliminate variations present between different detectors, resulting from the manufacture of the array.

According to a second method, the value measured for each active resistor $R_p$ may be defined as a function of the temperatures and/or resistances measured respectively for the detectors of a part of the array 1. For example, the value measured for an active resistor $R_p$ may be compared to a mean of the values measured for the detectors of the array part. This second method may make it possible, in particular, to account for overall ageing of the detectors which is accepted.

Optionally, when the value measured for a particular detector is equal or close to the reference value or the mean value determined for the array part in question, it may be decided that the detector does not require that the maintenance method is applied thereto. Simultaneously, the detectors to which the method is to be applied may be selected on the basis of the temperature/resistance values measured for same.

A single temperature/resistance threshold value may also be defined for all the detectors of the array, so as to heat them all together up to said common threshold value. In this case, the common threshold value may be defined as a function of the values measured for all the detectors of the array, and optionally as a function of thermodynamic properties of the array. It may also be defined as a function of the values measured for previously damaged detectors in the array.

During a third step of the maintenance method, the selected detectors are heated by Joule effect to the temperature/resistance threshold value defined for each.

Such heating may be performed detector by detector, for example by supplying the active resistor $R_p$ of each individually with a suitable electric current. In this first case, it may be necessary to heat each selected detector in succession, due to thermal interactions that may exist between detectors close to each other in the array 1.

Alternatively, a plurality or all of the selected detectors may be heated simultaneously. In this way, the duration of the maintenance method may be reduced. In this second case, electric currents may be supplied simultaneously in a plurality of active resistors $R_p$ of the detector array, in a manner suitable for heating the selected detectors at the same time to temperature/resistance threshold values defined respectively for each of them. These currents may then be determined using an algorithm for processing the temperatures and/or resistance measured respectively for the selected detectors. In this way, each detector may be heated more precisely to the corresponding temperature/resistance threshold value, accounting for thermal interactions that may occur between different detectors.

In particular, all the detectors selected to undergo the maintenance method may be heated at the same temperature. This common temperature may correspond to a maximum temperature/resistance threshold value determined for said detectors.

Each detector to which the method according to the invention is applied is heated so as to eliminate, or else reduce, physicochemical feature deviations that the detector may previously have had.

The radiation-sensitive resistive element of a detector to which the maintenance method is applied is thus restored to a reference physicochemical state, which may correspond to an initial state or a mean state of all the resistive elements of the array. Within the scope of the present invention, the term physicochemical state refers to any physical, structural or chemical feature or property of the radiation-sensitive resistive material. Typically, the threshold temperature at which a detector is heated may be greater than 60° C., or greater than 100° C.

More generally, following damage to one or a plurality of pixels of a set of pixels of an array, it is possible to heat all the pixels thereof to erase the effect of overexposure locally. All the pixels of the array are then placed in a common heating state, greater than or equal to the threshold temperature of the maintenance method.

Furthermore, the heating may be adjusted to avoid any damage to the radiation-sensitive material liable to be caused by an excessive temperature. For this reason in particular, the temperature at which a detector is heated may be less than 200° C., or less than 180° C.

In a fourth step of the maintenance method, the selected detectors heated according to the maintenance method above the threshold temperature are cooled in a controlled manner, by progressively reducing the currents supplied to the resistive elements used for the heating in the third step. Such controlled cooling makes it possible to prevent causing a quench, liable to leave the radiation-sensitive resistive material of any of the detectors in an unstable state. Typically, the cooling duration may be several minutes, for example more than ten minutes. Those skilled in the art are able to adjust the duration of such cooling, as a function of the type of radiation-sensitive resistive material and the ability of the environment thereof to dissipate heat.

In particular, the fourth step of the method may be controlled such that at least the heated detectors to which the maintenance method is applied are cooled simultaneously, in a synchronised and identical manner. In other words, the cooling is uniform for these detectors such that the temperature of the heated resistive elements is homogeneous.

For the third and fourth steps of the maintenance method, the electric current supply of resistive elements of the array 1 may be carried out either in continuous mode, or via pulses. In the first case, each electric current is controlled by an intensity thereof. In the second case, it may be controlled by means of a pulse period ratio. Thermal inertias and, in particular, thermal time constants of the detectors are thus used advantageously. The period ratio, if heating is required, will have a period less than or of the same order of magnitude as the thermal time constant of each detector. On the other hand, if progressive cooling is required, the period ratio will have a period greater than the thermal time constant of the detectors.

Furthermore, the currents supplied in the resistive elements of the array 1 may be controlled with results of temperature/resistance measurements repeated during the third and fourth steps. Such a control may help to ensure that the threshold temperatures/threshold resistances are not exceeded and that the cooling corresponds to a predetermined variation.

An electromagnetic radiation measurement assembly suitable for a maintenance method according to the invention may have the logical structure represented in FIG. 4. It comprises the array of detectors 1, associated with an addressing system 40. The addressing system 40 makes it possible to send an electric current in the radiation-sensitive resistive elements of any detector of the array 1, said detector being identified by its array coordinates. The addressing system 40 also enables the transmission of an electric signal produced by any detector of the array 1, identified in the same way. In particular, this transmitted signal may represent the value of the electric resistance of the radiation-sensitive resistive element, for the identified detector.

The addressing system 40 is preferentially of the CMOS (Complementary Metal Oxide Semiconductor) type, as opposed to the CCD (Charge Coupled Device) type. Indeed, CMOS type addressing enables the easy selection of one or a plurality of detectors of the array 1. It also gives the option of controlling the electric power sent to each detector.

In radiation detection operating mode, the representative signals of the electric resistance values of the detectors are transmitted to reading means 50, which may be suitable for producing a thermal image of the radiating scene towards which the measurement assembly is oriented. This image may then be transmitted to a recording unit 60.

The additional means of the radiation measurement assembly, which are dedicated to the maintenance of the array 1, are referenced 100 in FIG. 4. They may comprise a temperature processing unit 10, a current computation unit 20, an electric power supply unit 30 and measurement means. According to one advantageous embodiment, the measurement means used for the maintenance method may be combined with reading means 50 used for radiation detection.

The processing unit 10 may receive representative signals of the temperatures measured for at least some of the detectors of the array 1. On the basis of these measurement signals, it determines the threshold temperature at which, or beyond which, the identified detectors should be heated. Optionally, the processing unit 10 may select the detectors that need to be heated.

The computation unit 20 determines, on the basis of threshold temperatures determined by the processing unit 10, and for the detectors selected by same, the electric currents to be supplied to some of the detectors of the array 1, so that each identified detector for the maintenance method reaches the corresponding threshold temperature. Optionally, the two units 10 and 20 may be grouped into the same entity.

Finally, the power supply unit 30 produces electric currents corresponding to current set-points transmitted by the computation unit 20. These currents are transmitted by the addressing system 40 to the detectors of the array 1 identified by the array coordinates thereof, in turn produced by the computation unit 20.

The computation unit 20 may also be suitable for controlling the power supply unit 30 during the cooling step, so that the power supply unit 30 produces currents progressively decreasing over a predetermined duration after the threshold temperatures have been reached. Optionally, this cooling may be controlled by a control loop involving the measurement means 50 and the units 20 and 30.

It is understood that the implementation of the invention described in detail above may be adapted or modified while retaining at least some of the advantages cited. In particular, adaptations of the logical structure of FIG. 4 may be introduced by those skilled in the art, without however modifying the maintenance method per se significantly. Of the main advantages of the invention, it should be noted that said invention makes it possible to suppress an oven or a Peltier element incorporated in the detection assembly, dedicated to the maintenance of bolometer-type detectors according to the prior art.

The invention claimed is:

1. A method for maintenance of an array of bolometer-type detectors suitable for measuring electromagnetic radiations originating from a radiating scene, said method being suitable for stopping persistence of a radiation overexposure experienced by at least one of the detectors of the array, and comprising the following steps performed apart from a radiation measurement sequence:
   - /1/ measurement of a temperature and/or electric resistance of a resistive element of at least one identified detector of the array;
   - /2/ for said identified detector, setting of a threshold temperature and/or threshold resistance, respectively greater than the temperature measured and/or less than the resistance measured in step /1/;
   - /3/ supply of a resistive element of at least one detector of the array, with an electric current suitable for heating the identified detector at least up to said threshold temperature and/or the threshold resistance; and
   - /4/ cooling of said identified detector, by progressively reducing the electric current supplied to the resistive element used in step /3/ for heating said identified detector.

2. The method according to claim 1, wherein the threshold temperature and/or the threshold resistance is set in step /2/ as a function of a deviation between the temperature and/or resistance measured in step /1/ for said identified detector and a temperature and/or resistance reference value, respectively.

3. The method according to claim 1, comprising an additional step for selecting the identified detector, performed between steps /1/ and /2/, after which steps /2/ to /4/ are performed for said identified detector only if the temperature and/or resistance measured in step /1/ for said detector satisfy a defined selection condition.

4. The method according to claim 3, wherein the selection condition is defined such that the identified detector is selected for steps /2/ to /4/ if said identified detector has persistence from a previous radiation overexposure or damage during the operation thereof.

5. A method according to claim 3, wherein the additional step for selecting the identified detector is performed by means of CMOS type addressing.

6. The method according to claim 1, wherein the electric current supply in step /3/ is performed by means of CMOS type addressing.

7. The method according to claim 1, wherein the step /3/ is performed so as to modify a material of the identified detector, said modified material being sensitive to electromagnetic radiation during a radiation measurement sequence.

8. The method according to claim 1, wherein the detector resistive element used in step /3/ for heating the identified detector belongs to said identified detector.

9. The method according to claim 1, wherein the identified detector is heated in step /3/ to a temperature greater than 60° C., preferentially greater than 100° C.

10. The method according to claim 1, wherein step /3/ is performed so as to maintain said identified detector for a duration of at least one minute at a temperature greater than or equal to the threshold temperature, and/or at a resistance less than or equal to the threshold resistance.

11. The method according to claim 1, wherein the cooling in step /4/ has a duration greater than at least two minutes, or greater than ten minutes.

12. The method according to claim 1, further comprising a step for measuring the respective temperatures and/or resistances of the detectors of at least part of the array, and wherein the threshold temperature and/or the threshold resistance of the identified detector is set in step /2/ as a function of the temperatures and/or resistance measured for the detectors of said part of the array, in addition to the temperature and/or resistance measured for said identified detector.

13. The method according to claim 1, wherein step /1/ is performed for a plurality of identified detectors, and wherein electric currents are supplied in step /3/ simultaneously to respective resistive elements of a plurality of detectors of the array, said electric currents being determined using an algorithm for processing the temperatures and/or resistances measured respectively for the identified detectors, so as to heat said identified detectors simultaneously.

14. The method according to claim 13, wherein said identified detectors are heated simultaneously up to a common maximum temperature.

15. The method according to claim 1, performed automatically.

16. An assembly for measuring electromagnetic radiation from a radiation scene, comprising:
    an array of bolometer-type detectors;
    an addressing system suitable for identifying any detector in the array; and
    means for maintaining said array.

17. The assembly according to claim 16, wherein the maintenance means are suitable for controlling automatic execution of the maintenance method.

18. The assembly according to claim 16, wherein the maintenance means themselves comprise:
    means for measuring temperatures and/or resistances of respective resistive elements of detectors in the array, said measurement means being suitable for supplying measurement signals for identified detectors of the array;
    a unit for processing the temperatures and/or resistances measured by the measurement means for the identified detectors, said processing unit being suitable for determining a threshold temperature and/or a threshold resistance for each of the identified detectors;
    an electric current power supply unit, connected to the detectors of the array by the addressing system; and
    a unit for computing at least one electric current to be supplied by the power supply unit to at least one detector of the array, so that each identified detector reaches a temperature greater than or equal to the threshold temperature, and/or a resistance less than or equal to the threshold resistance, determined for said identified detector, said computation unit being additionally suitable for controlling a progressive reduction of said electric current.

* * * * *